COMBINED SYNCHRONOUS DEMODULATOR AND ACTIVE MATRIX

Filed Dec. 30, 1966

3 Sheets-Sheet 1

Inventor
Fleming Dias
By Francis W. Crotty
Attorney

Sept. 9, 1969 F. DIAS 3,466,400

COMBINED SYNCHRONOUS DEMODULATOR AND ACTIVE MATRIX

Filed Dec. 30, 1966 3 Sheets-Sheet 2

Inventor
Fleming Dias

By Francis W. Crotty

Attorney

COMBINED SYNCHRONOUS DEMODULATOR AND ACTIVE MATRIX

Filed Dec. 30, 1966

Inventor
Fleming Dias
By Francis W. Crotty
Attorney

United States Patent Office 3,466,400

Patented Sept. 9, 1969

3,466,400

COMBINED SYNCHRONOUS DEMODULATOR AND ACTIVE MATRIX

Fleming Dias, Chicago, Ill., assignor to Zenith Radio Corporation, Chicago, Ill., a corporation of Delaware Filed Dec. 30, 1966, Ser. No. 606,279

Int. Cl. H04j *1/00;* H03d *3/18;* H04n *5/44*

U.S. Cl. 179—15 16 Claims

ABSTRACT OF THE DISCLOSURE

Synchronous demodulator and active matrix network comprising a dual emitter transistor, or a pair of transistors, operating as a push-pull amplifier and separator for a plurality of distinct signals.

The present invention is directed to a combined or unitary synchronous demodulator and active matrix network and, more particularly, is directed to such an arrangement for developing a plurality of useful demodulated output signals from a reception including a suppressed-carrier, amplitude modulation signal component. The invention finds unique and attractive application in stereophonic FM and color television receivers and, accordingly, will be described in both contexts.

Under presently accepted F.C.C. standarsd, the modulation components of a stereophonic transmission comprise an audio sum signal component $(L+R)$, a difference signal component $(L—R)$, present as amplitude modulation of a suppressed subcarrier and a pilot tone used to synchronize receiver instruments in demodulation of the difference signal component. The stereophonically related L and R audio signals may be separately developed at the receiver by any one of several known circuit constructions. According to one conventional and popular technique, the sum and difference signal components, in conjunction with a reinserted subcarrier locally derived from the pilot signal, are applied to a pair of diodes poled to conduct on opposite half-cycles of the subcarrier signal. A variance in efficiency of the diodes between translating the audio signal and detecting the difference signal results in the respective stereo signals developed in each diode load circuit having some degree of cross-talk or unwanted signal contribution from the other channel. This cross-talk is cancelled by matrixing the output from each stereo channel with a predetermined amount of out of phase sum signal. Heretofore derivation of this matrixing signal required that the receiver be specially provided with a phase-splitting stage or with some other special accommodating apparatus with attendant increase in cost and complexity of the receiver.

The situation in a color television receiver is in many respects similar to that outlined above. Specifically, the NTSC standards specify that a composite color television transmission include a suppressed-subcarrier signal amplitude-modulated with a plurality of color control signals which collectively define the hue and saturation of an image to be reproduced. A conventional television receiver for use with the NTSC system includes an image screen composed of a mosaic of phosphor triads and three electron guns for independently scanning respective elemental areas of each triad. In such a receiver, it is essential to ultimately derive three color control signals, usually the R–Y, B–Y and G–Y color difference signals, for intensity modulating the electron beams of respective ones of the three electron guns. Since the color control signals are interrelated, it is often desirable only to demodulate two color control signals at the receiver and then matrix these signals in proper magnitude and phase to derive the remaining control signal. For instance, assuming as is often convenient that the R–Y and B–Y signals are selected for demodulation, then the G–Y signal may be defined as follows:

$$G-Y=-.51\ (R-Y)-.19(B-Y)$$

The prior art in this example derives the G–Y control signal by use of a phase inverter and matrix network in addition to the demodulating apparatus for the first two control signals; alternatively, the prior art has used a pair of electron beam switching tubes or gated pentodes to develop the G–Y component. Although many of the prior art approaches are indeed technically satisfactory, they are relatively complicated and expensive. Also, they do not lend themselves well to the requirements of integrated circuit construction.

It is therefore an object of the present invention to provide a new and improved synchronous demodulator and active matrix network overcoming the aforenoted disadvantages of the prior art.

It is also an object of the present invention to provide such combined apparatus which utilizes only components of a character readily susceptible of construction by integrated circuit techniques.

It is another object of the present invention to provide a simplified detector for a stereo receiver.

It is yet another object of the present invention to provide a uintary color demodulator and active matrix network for directly developing the three primary color control signals without the use of sophisticated special purpose tubes, separate phase inverting stages or the like.

Accordingly, the present invention is directed to a combined synchronous demodulator and active matrix network for developing a plurality of demodulated output signals from a received signal including a suppressed-carrier amplitude-modulated component. Specifically, the circuit includes means for locally deriving a reference signal having a frequency equal to that of the absent subcarrier, transistor amplifying means having two emitter electrodes and at least one each of a control and collector electrode and means for applying the reference signal in effectively different phases to each of the two emitter electrodes. Means are also provided for applying the suppressed-carrier amplitude-modulated signal to each base electrode of the amplifying means while further means, including individual load resistors coupled to the aforesaid emitter electrodes, are provided for developing first and second distinct, demodulated output signals in response to application of the reference and modulated signals as aforesaid. Passive circuit means, coupled to each collector electrode of the amplifying means, are effective for deriving a third distinct output signal consisting of a phase inverted and amplified vector summation of the first and second distinct, demodulated output signals combined in a predetermined weighted relationship.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figures 1, 2:
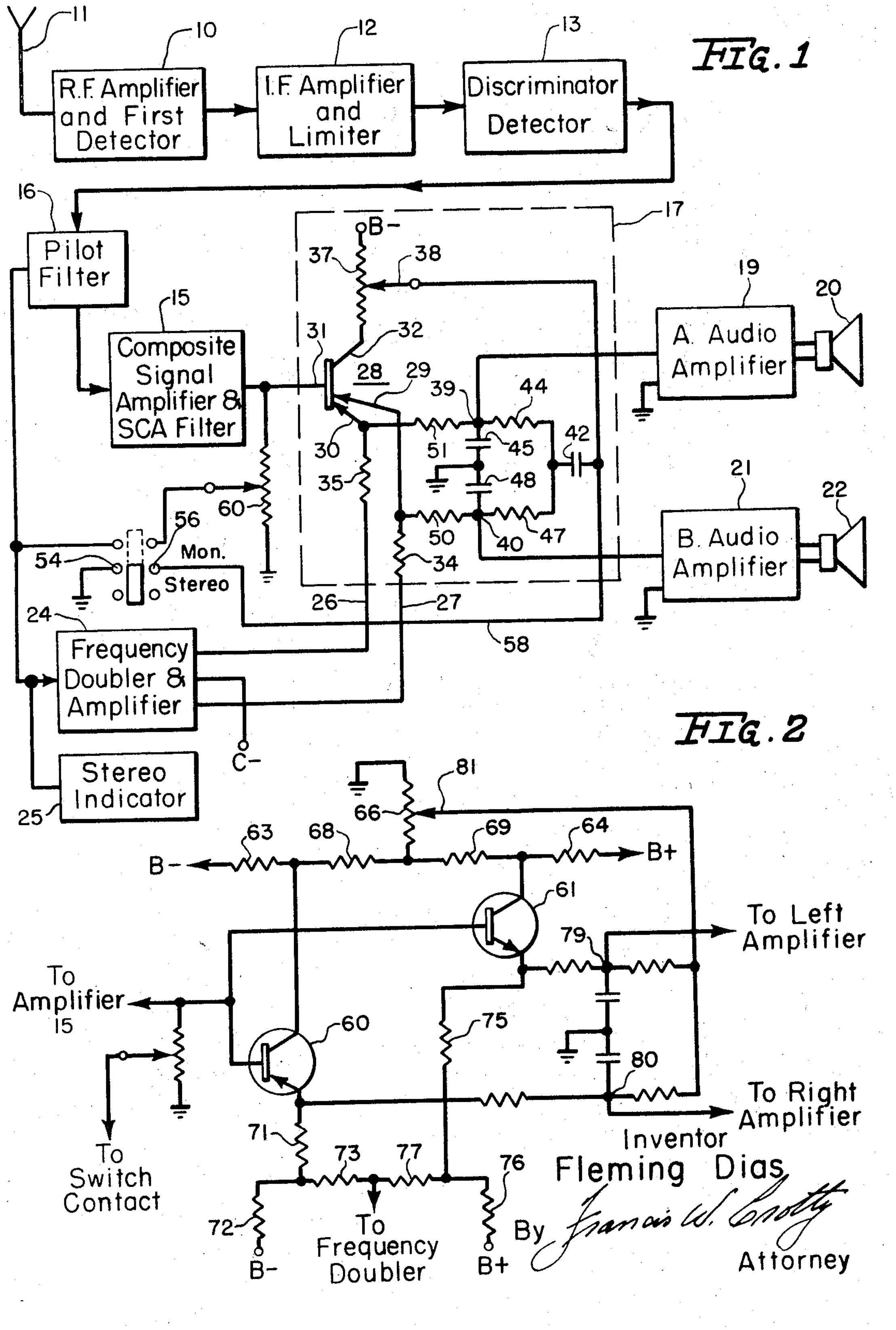
FIGURE 1 is a schematic illustration of a preferred embodiment of the invention as utilized in the context of FIGURE 2 is a partial schematic diagram showing an alternative embodiment of the invention useful in a stereo receiver.

Referring now to FIGURE 1, the stereophonic receiver there shown comprises circuits which through the SCA filter and composite amplifier are conventional. These include a radio frequency amplifier of any desired number of stages and a heterodyning stage or first detector, both being represented by block 10. The input of the amplifying portion connects with a wave signal antenna 11 and the output is coupled to a unit 12 which may include the usual stages of intermediate frequency amplification and one or more amplitude-limiters. Following IF amplifier and limiter 12 is a frequency modulation detector 13 responsive to the amplitude-limited IF signal for deriving an output signal representing the modulation of the received carrier. Second detector 13 may be of any well-known configuration, but since a high degree of amplitude limiting is desirable, it is preferable that this unit be a ratio detector. The composite modulation signal, which as will be recalled, comprises an audio sum signal, a difference signal amplitude-modulated on a suppressed subcarrier and a pilot tone at one-half the frequency of the absent subcarrier, is developed at the output of the detector 13 and is applied to a composite signal amplifier and SCA filter 15 through a series connected pilot filter 16; filter 16 represents a relatively low impedance to all but the pilot component. The SCA filter of block 15 serves as an attenuator for the subcarrier frequency used for Subsidiary Communications Authorization (SCA) reception, a subscription background music service authorized by the Federal Communications Commission. A stereo detector 17 is coupled to the output of amplifier 15, and is responsive to the audio sum signal, the suppressed carrier amplitude modulated difference signal and a demodulation signal developed from the pilot tone and having a frequency and phase equal to that of the absent subcarrier, for developing the stereophonically related signals separated one from the other. As shown, the L and R stereophonically related signals thus developed are applied to individual amplifiers and loudspeakers 19, 20 and 21, 22, respectively. Of course, loudspeakers 20 and 22 are spatially arranged to create a stereophonic sound pattern in the area they serve.

Since, as previously explained, demodulator 17 must be properly synchronized for detection of the subcarrier, there is provided means for locally deriving a reference signal having a frequency equal to that of the absent subcarrier. This includes the pilot filter 16 which selectively extracts the pilot tone from the composite signal modulation and applies this tone to a frequency doubler and amplifier 24. The pilot tone may also be utilized to directly actuate an indicator lamp circuit 25 to provide a visual indication of stereophonic reception. Doubler 24 operates on the pilot signal to develop a switching signal in frequency and phase coherence with the absent subcarrier; this signal is applied in push-pull to detector 17 via conductors 26 and 27. For reasons that will be explained, conductors 26 and 27 normally carry a negative operating bias from the illustrated C— supply.

Turning now to a more specific consideration of detector 17, this circuit is seen to comprise a transistor amplifying means 28 having two emitter electrodes 29 and 30 and at least one each of a control and a collector electrode. Herein, amplifying means 28 is in the form of a dual emitter transistor and accordingly has only one base and one collector electrode, labelled respectively 31 and 32 in the drawing, which serve in common for the two emitter electrodes 29 and 30. Such dual emitter transistors are known per se to the art and are commercially available from several companies. Functionally, this device operates exactly as an ordinary three terminal transistor except that the emitter current is divided between the two emitter electrodes, the proportion of the total collector current flowing through each emitter electrode being related to its relative impedance and relative biasing with respect to the base electrode.

In accordance with the present invention, composite amplifier 15 is coupled to base electrode 31 of transistor 28 to apply at least the suppressed-carrier amplitude-modulated portion of the composite stereo signal thereto. The respective emitter electrodes 29, 30 of transistor 28 are coupled through individual load resistors 34 and 35 to output terminals 27 and 26, respectively of frequency doubler 24. By these connections, the reconstituted subcarrier reference signal is applied to each of the two emitter electrodes in phase opposition, concomitantly with application of the composite signal to the transistor base electrode.

The collector electrode 32 of transistor 28 is coupled to a B— operating supply by passive circuit means, here constituting a tapped load resistor 37. The intermediate tap 38 of load resistor 37 is coupled to respective independent matrix junctions 39, 40 by a coupling capacitor 42 and conventional L-section de-emphasis networks 44, 45 and 47, 48 respectively. The emitter electrodes 29 and 30 of transistor 28 are coupled respectively to matrix junction 39 and 40 through individual de-emphasis networks 50, 48 and 51, 45.

The receiver of the present invention not only reproduces stereophonic FM broadcasts but is also capable of compatible reception and reproduction of monaural FM transmissions. Specifically, the present receiver may selectively reproduce only monophonic program information or only stereophonic information and those portions of the receiver that are uniquely required for stereo are activated only during the reception of the stereophonic broadcast signal. To this end, the receiver is provided with a slide switch 52 which is manually movable between a monaural and a stereo position, as indicated in the drawing. The switch 52 is composed of an insulative material provided with separate conductive surfaces on its left-hand and right-hand sides for shunting adjacent contact points between which the switch is positioned. As shown, both of the lowermost contacts are open or unconnected and accordingly an intermediate grounded contact 54 and an opposite intermediate contact 56, which is coupled by a conductor 58 to coupling capacitor 42 in shunt to transistor 28, is likewise open. As will presently be explained, only stereophonic broadcast signals are reproduced at the loudspeakers with the switch in this position.

When switch 52 is moved to the monaural position, indicated in dashed outline in the drawing, it is seen that contact 54 is connected to apply a ground potential to the input of frequency doubler 24. Also a predetermined portion of the output of composite amplifier 15, developed at the tap of a shunt load resistor 59, is coupled equally to both audio amplifiers and loudspeakers through contact 56 in shunt to transistor 28.

In considering the operation of the receiver of FIGURE 1, it will be initially assumed that a stereophonic broadcast is being received and thus switch 52 is in its stereo position as indicated. Under such conditions, the stereophonically modulated carrier intercepted by antenna 11 is translated in conventional fashion to detector 13 whereat the modulation components corresponding to that broadcast are derived. The audio sum signal and the difference signal modulation are translated through pilot filter 16, which represents a low impedance to these signals, and are developed at a high level at the output of amplifier 15. Since, as assumed, switch 52 is in its stereo position these signal components are applied only to the base electrode of transistor 28 across shunt load resistor 59.

Meanwhile, the pilot signal extracted from the composite modulation filter 16 is coupled both to a stereo indicator 25, which may include a lamp or the like to provide a visual indication of such reception, and to doubler circuit 24. As with all circuits shown in block form in FIGURE 1, doubler 24 may be of entirely conventional construction and, for example, may comprise a full-wave rectifier for the pilot tone followed by an amplifier tuned to the second harmonic of this frequency. Of course, the second harmonic of the pilot tone is identical in frequency and phase with the absent subcarrier. This reconstituted reference signal is applied to the individual emitter electrodes of transistor 28 in push-pull relation through conductors 26 and 27. The reference signal developed between conductors 26 and 27 is of an amplitude sufficient to periodically override the normal reverse bias applied to emitters 29 and 30 from the C— supply and to render these electrodes alternately forward and reverse biased with respect to base electrode 31 at the subcarrier frequency rate.

Thus, during one half-cycle of the reference subcarrier, emitter 30 functions as the sole emitter for transistor 28 and during the next or alternate half-cycle electrode 29 is the exclusive emitter electrode for transistor 28. Accordingly, by now well understood demodulation theory, there is developed across emitter load resistor 35 signal components corresponding to the product of the composite modulation information and a 1–0 switching function. Similarly, there is developed across emitter resistor 34 demodulation components corresponding to the product of a 0–1 switching function and the composite signal information. It can be demonstrated that the audio information developed in the respective emitter load resistors under these circumstances is as follows:

Audio component at emitter 35

$$=\tfrac{1}{2}(L+R)+1/\pi(L-R)\cong .8L+.2R$$

Audio component at emitter 34

$$=\tfrac{1}{2}(L+R)-1/\pi(L-R)\cong .8R+.2L$$

According to the present invention, the residual cross-talk contribution in each stereo channel is cancelled by a matrixing signal inherently developed within the stereo detector. Specifically, transistor 28, in order to function in conventional fashion, is necessarily provided with an operating bias through a collector load resistor 37. Since collector electrode 32 is common to emitter electrodes 26 and 27, it should be apparent the signal developed across collector load resistor 37 is equal to the phase-inverted and amplified vector summation of the signals developed in the individual emitter circuits. This third output signal equals $-K(L+R)$ where K is the amplification factor of transistor 28. Setting variable tap 38 of the collector load resistor such that the fraction of matrix voltage is just sufficient to cancel the cross-talk, it will be apparent that at matrix junctions 39 and 40 there are developed respectively only the L and R audio signals which are individually amplified and reproduced by respective audio amplifiers and loudspeakers 19, 20 and 21, 22. Those skilled in the art will appreciate the relative simplicity of the present circuit in directly and inherently providing a matrixing signal and that the present circuit arrangement is especially wel-suited for construction by integrated circuit techniques.

Assuming now that a monophonic broadcast is being received and switch 52 continues in its stereo position, it will be seen that no audio reproduction whatsoever takes place. Under the recited conditions, the output of detector 13 corresponds to the audio components of a monophonic broadcast and these components are translated through filter 16 and amplifier 15 to the base electrode of transistor 28. Since no pilot signal is being received both emitter electrodes 29 and 30 of this transistor remain back or reverse biased from the C— operating supply and transistor 28 is thus rendered totally inoperative. Furthermore, the tap on base load resistor 59 is open and provides no alternate path for the monaural signal. Thus, when switch 52 is in its stereo position only stereophonic broadcasts are reproduced. It will be recognized that this presence or lack of reproduction is indeed a stereo indication and that the indication provided by the lamp of device 25 is redundant and may be omitted, if desired.

Considering now the situation where a monaural signal is received and switch 52 occupies its upper or monaural position, it will be seen that grounded contact 54 is coupled to the input of frequency double 24 to disable this device and that the portion of the monaural program signal developed at the tap of resistor 59 is coupled by switch 52 through contact 56 and conductor 58 in equal levels to both audio amplifiers and loadspeakers. The tap point on resistor 59 is selected to render the monophonic signal to the two audio amplifiers of an amplitude nominally equal to that existing during stereo reproduction. This disabling of the frequency doubler is preferable as is substantially prevents false actuation or triggering of the pilot chain in rseponse to noise, particularly noise that may reach this device as the receiver is tuned over its band. It wlll also be noted that when switch 52 is in its monaural position that only monophonic programs or the monaural portion of stereo programs are reproduced.

By way of illustration but in no sense a limitation or restriction of the present invention, the following component values, types and operating biases were employed in the circuit of FIGURE 1 to receive and reproduce a stereophonic program:

| | | |
|---|---|---|
| Capacitor **42** | microfarads | 2 |
| Capacitor **45** | micromicrofarads | 7500 |
| Capacitor **48** | do | 7500 |
| Resistor **34** | ohms | 4.7K |
| Resistor **35** | do | 4.7K |
| Resistor **44** | | 10K |
| Resistor **47** | | 10K |
| Resistor **47** | | 10K |
| Resistor **50** | | 10K |
| Resistor **51** | | 10K |
| Tapped resistor **37** | ohms | 10K |
| Tapped resistor **59** | do | 10K |
| Transistor **28** (Type 3N123 manufactured by the Sprague Electric Co.) | | |
| B— supply | v | —20 |
| C— supply | v | —6 |

An alternative embodiment of the combined demodulator and active matrix network of the invention is shown in the partial schematic diagram of FIGURE 2. This circuit is similar to the detector of FIGURE 1 excepting that in place of the dual emitter transistor there are employed amplifying means consisting of a pair of transistors of opposite gender. In the present state of the art, a complementary pair of transistors may be manufactured in a single monolithic chip and are therefore suitable for integrated circuit construction. Specifically, this circuit comprises a PNP transistor 60 and an NPN transistor 61 having their base electrodes connected in common and joined to the output of amplifier 15. The collector electrodes of transistors 60 and 61 are coupled respectively to B— and B+ operating supplies through individual load resistors 63 and 64. These transistors also share a common load circuit comprising a tapped resistance 66 having one end terminal grounded and it opposite end terminal connected to the common junction of a pair of resistors 68, 69 extending respectively from the collector electrodes of transistors 60, 61.

The emitter of transistor 60 is coupled by a pair of series load resistors 71, 72 to a B— operating supply. The common junction of these resistors receives an input signal from frequency doubler 24 through an isolating resistor 73. Similarly the emitter electrode of transistor 61 is coupled to a B+ bias supply via series load resistors 75, 76. The common junction of resistors 75, 76 is returned to the same polarity terminal of frequency doubler 24 as the emitter of transistor 60 by an isolating resistor 77.

Although in the present embodiment only a single ended output of frequency doubler 24 is used, it will be apparent to those skilled in the art that transistors 60 and 61 are only conductive in alternation. The opposite gender of the transistors causes the reference signal to be applied to the emitter electrodes in effectively different phases. The emitter electrodes of transistors 60 and 61 are also coupled by individual de-emphasis networks to respective ones of matrix junctions 79, 80. The intermediate tap of common collector resistance 81 is connected to both matrix junctions 79 and 80 through conventional de-emphasis networks. As shown, matrix points 79 and 80 are coupled by respective conductors to the R and L audio amplifiers, not shown.

The operation of the circuit of FIGURE 2 is quite similar to that previously explained in connection with the circuit of FIGURE 1. Briefly, assuming the conditions for stereophonic reception, the composite information of that signal is applied in like polarity to the base electrode of both transistors 60 and 61. The presence of the subcarrier switching signal at the emitter electrodes of these transistors is such as to alternately render the transistors conductive and nonconducrtive at the subcarrier rate. As has been shown, such action results in predominantly the R audio signal being developed at the emitter electrode of transistor 60 and predominantly the L audio signal being developed at the emitter of transistor 61 or vice versa depending on the selected polarity of the subcarrier switching signal. The undesired cross-talk is cancelled at matrix points 79 and 80 by addition of a proper amount of out of phase sum signal developed at the tap of common collector load resistor 66. It will be noted that this embodiment of the invention, by employing opposite gender transistors, demands only a single ended output from frequency doubler 24 and that the coupling capacitor 42 of FIGURE 1 is eliminated by balancing the center junction of resistors 68, 69 against ground from the B− and B+ operating supplies. The elimination of coupling capacitors by use of such balanced circuits facilitates construction of the receiver by integrated circuit techniques.

The present invention also finds important application as a unitary color demodulator and active matrix network in a color television receiver. As will be recalled, present NTSC standards specify that a composite color television transmission include a suppressed subcarrier component amplitude and phase modulated with information defining the hue and saturation of an image to be reproduced. Conventional television receivers for this purpose include an image screen composed of a mosaic of phosphor triads and three electron guns for independently scanning respective elemental areas of each triad. The electron beam intensity of each gun must be separately controlled and therefore it is ultimately necessary to derive three color control signals, usually denominated the R–Y, B–Y and G–Y color difference signals, to effect this end. As will presently be seen, the circuit of the invention directly demodulates two of the three control signals and as a surprising and inherent byproduct of proper connection of this novel demodulator to effect its function, there is derived the third color control signal.

Figure 3:
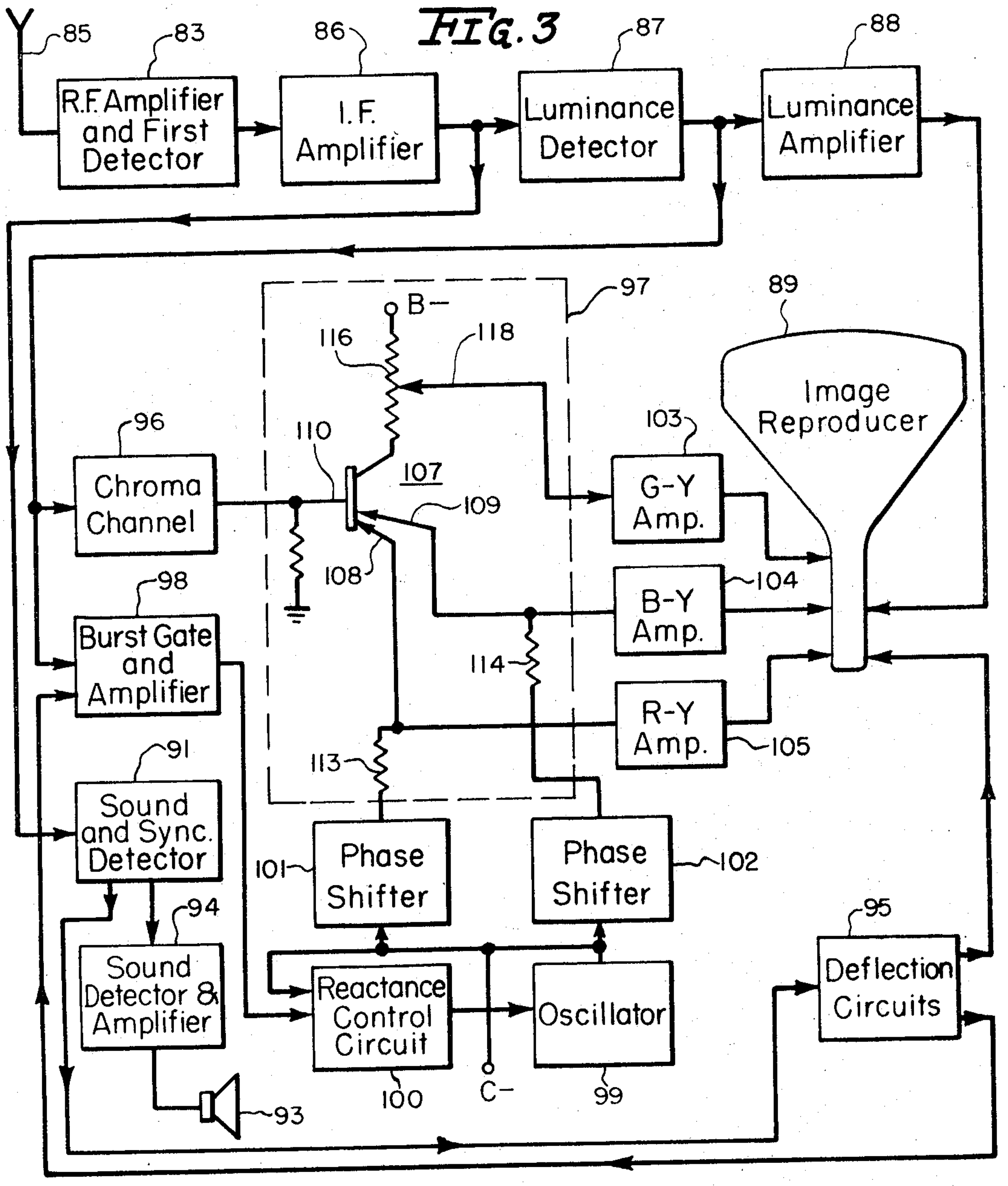
FIGURE 3 is a schematic diagram of a color television receiver embodying the present invention.

Referring specifically now to FIGURE 3, the color television receiver there illustrated comprises a radio-frequency amplifying and first detector stage 83 which derives an input in conventional fashion from a wave-signal antenna 85. The intermediate-frequency output signal from the heterodyning stage of block 83 is coupled to an IF amplifier 86 which, in turn, is coupled both to a luminance detector 87 and to sound and sync circuits to be described. The video frequency output of luminance detector 87 is coupled along two paths, the first being to a luminance amplifier 88 which may include any desired number of amplifying stages and an appropriate time delay network. The amplified video signal provided by luminance amplifier 88 is definitive of relative pictorial brightness or intensity; this signal is applied to an image reproducer 89, which in this case may be a standard three-gun, shadow-mask color cathode-ray tube. The construction of this tube as well as other apparatus shown in block form in the figure is not critical to the present invention and may take any of a variety of forms well-known to the art.

The image scanning and the sound portions of the composite color transmission are also developed from circuits coupled to the output of IF amplifier 86. These circuits include a sound and sync detector 91. The sound bearing portion of the output signal from detector 91 is coupled to a loudspeaker 93 by a sound detector and amplifier 94. The remaining signal components are supplied to deflection circuits 95 which are coupled to the deflection system of image reproducer 89.

The signal at the output of luminance detector 87, in addition to including video frequency components, also includes a suppressed-carrier component which, as previously stated, is amplitude and phase modulated with a plurality of color control signals collectively defining the hue and saturation of the received image. The modulated subcarrier above-described is singularly developed in a chroma channel 96 which includes appropriate filter networks and amplifying stages and from there is applied to a novel chrominance detector 97 shown in dashed outline in the drawing.

A subcarrier demodulator within detector 97 is synchronized by a locally derived reference signal which is derived from a component of the color transmission likewise available at the output of detector 13 and constituting short, periodic signal bursts in frequency and phase coherence with the absent subcarrier. The means for developing the local reference signal includes a burst gate and amplifier 98 coupled to receive an input from luminance detector 87. Device 98 is periodically gated on by pulses from deflection circuits 95 so as to be operative only during intervals in which reference burst signals are received. The amplifier burst signals from block 98 are coupled to a local oscillator 99 by a reactance control circuit 100. Control circuit 100 compares the reference burst with the output signal of oscillator 99 to generate an error signal which effectively locks the oscillator in a predetermined phase and frequency relation with the reference burst. The local reference signal thus developed is applied through individual phase shifting networks 101 and 102 to detector 97. Detector 97 operates on the foregoing signals to provide at its output three color difference signals which are individually amplified by amplifiers 103, 104 and 105 and are separately applied to image reproducer 89, wherein they are combined with the luminance signal from luminance amplifier 88 to reproduce images having proper luminance and chrominance characteristics.

Turning now to a more specific consideration of detector 97, it is seen that this circuit comprises a transistor amplifying means 107 having two emitter electrodes 108 and 109 and at least one each of a control and a collector electrode. Herein, amplifying means 107 consists of a dual emitter transistor and accordingly has only one base and one collector electrode, labelled respectively 110 and 111 in the drawing, which serve in common the two emitter electrodes 108 and 109. The construction and operation of this device was previously recited herein and need not be repeated.

In accordance with the subject invention, the output from chroma channel 96 is coupled to the base electrode 110 of transistor 107 to apply the color subcarrier modulation components thereto. The emitter electrodes 108 and 109 of transistor 107 are coupled through individual load resistors 113 and 114 to phase shifters 101 and 102, respectively. By these connections, the subcarrier reference signal developed by local oscillator 99 is applied to each of the two emitter electrodes in effectively different phases concurrently with application of the chroma modulation to the transistor base electrode. For reasons which will be explained, emitter electrodes 108 and 109 are both normally back-biased with respect to base electrode 110 from a C— supply which is illustrated as being coupled to the output of oscillator 99. The collector electrode 111 of transistor 107 is coupled to a B— operating supply by a common collector load impedance, here consisting of a tapped load resistor 116. The intermediate tap 118 of load resistor 116 is coupled as a singular input to a G–Y amplifier 103. The emitter electrodes 108 and 109 of transistor 107 are likewise individually coupled to control signal amplifiers, namely, the R–Y amplifier 105 and the B–Y amplifier 104.

With the exception of detector 97, the color television receiver circuit of FIGURE 3 is quite conventional and, accordingly, only a brief description of its operation need be given here. A received composite color signal is intercepted by antenna 85 and is amplified and translated to an intermediate frequency by the amplifier and detector of block 83. Intermediate frequncy amplifier 86 further amplifies this signal, after which it is applied to both luminance detector 87 and sync and sound detector 91. The detected video components form detector 87, which represent the luminance component of a color telecast, are coupled with appropriate time delay and amplification through luminance amplifier 88 to image reproducer 89.

The detected output signal from sync and sound detector 91 is translated and amplified by conventional audio circuits 94 to drive loudspeaker 93. Detector 91 is also coupled to deflection circuit 95 which is responsive to the detected scanning information to develop the usual horizontal and vertical sweep signal required by image reproducer 89.

Chrominance channel 96 couples chrominance signals from luminance detector 87 to color detector 97. The frequency response characteristics of the chrominance channel is such that only that portion of the receiver signal generally corresponding to the color modulated subcarrier is translated to the base electrode 110 of dual emitter transistor 107.

Meanwhile, the adjacent burst gate and amplifier 98 is selectively responsive to the burst signal portion of the transmission and is gated on by pulses from the deflection circuit 95 so as to be operative only during the intervals in which the burst signals are received. The amplified burst signal is compared in phase and frequency with the signal from local oscillator 99 in reactance control circuit 100, and a control signal is generated corresponding to any phase error therebetween. This control signal is applied to the oscillator to effectively lock it in phase and frequency to the reference burst. The local reference signal thus derived, which corresponds in frequency and phase to the absent color subcarrier, is supplied through individual phase shifting networks 101 and 102 to the respective emitter electrodes of transistor 107 in different, predetermined phases. Each of these subcarrier frequency signals is of an amplitude sufficient to periodically override the normal reverse bias applied to its associated emitter from the C— supply and thereby render this emitter electrode alternately forward and reverse biased with respect to base electrode 110 at the color subcarrier frequency rate. The reverse bias from the C— supply is effective to preclude false actuation of the detector in response to randomly communicated noise signals and therefore serves as a color killer circuit.

Figure 4:
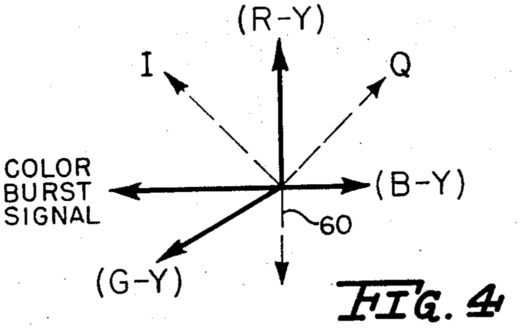
FIGURE 4 is a vector diagram showing the phaser relationships between various color control signals and the color synchronizing burst signal.
Figure 5:
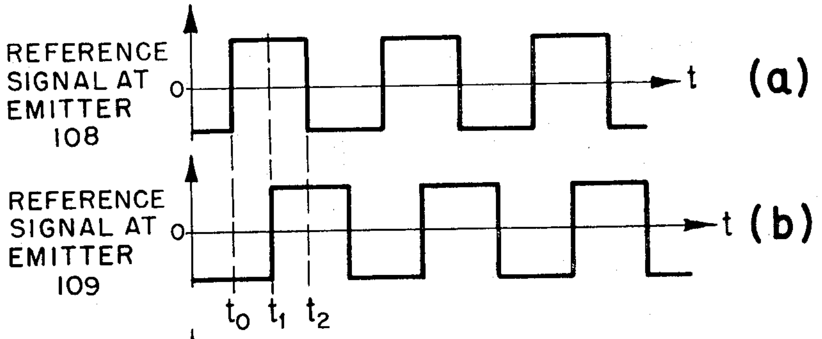
FIGURES 5, 6 and 7 are graphical plots useful in explaining several modes of operation of the circuit of FIGURE 3.

At this point, it is advantageous in understanding the operation of the circuit of the invention to pause momentarily and consider the diagrams of FIGURES 4 and 5. In FIGURE 4, there is known a phasor diagram depicting the relative angular displacement of the three primary color control signal vectors. As shown, the B–Y signal is in quadrature with the R–Y signal and is in phase opposition to the color burst. The G–Y control signal leads the R–Y signal by 146.8 degrees. As is well understood in the art, a shifting of the local reference signal into phase coincidence with any of the color difference signal vectors permits that difference signal to be demodulated by conventional synchronous detection methods. Furthermore, as is well understood to those skilled in the art, when two of the color control vectors are demodulated then the third color difference signal may be derived, without demodulation, by vector addition of the two demodulated difference signals. In fact, as will be discussed in further detail later herein, demodulation of any two color vectors, such as the I and Q vectors illustrated in FIGURE 4, is adequate to provide all the information necessary to develop the three primary color difference signals.

In the preferred embodiment of the invention shown in FIGURE 3, the R–Y and B–Y color difference signals are each synchronously detected by developing from the color burst signal individual local reference signals in phase coherence with respective ones of these color control signals; the third or G–Y control signal is developed by vector addition which inherently occurs within the detector.

Since regeneration of the absent subcarrier is accomplished by a phase lock system synchronized from the color burst signal, it is understood that the signal at the output of oscillator 99 lags the burst signal by 90 degrees or, in other words, is in phase coherence for demodulation of the R–Y signal. Accordingly, for demodulation of the R–Y signal at emitter electrode 108, phase shifter 101, shown for the more general case, may be omitted in this instance and the reference signal directly applied to emitter electrode 108 through load resistance 113. The introduction of a 90 degree phase lag by phase shifter 102 is used to permit development of the B–Y control signal at emitter electrode 109. It will be recognized that under the present circumstances phase shifting networks 101 and 102 may consist of a pair of transformer secondary windings coupled in quadrature phase to a primary winding which is connected to carry the output signal of oscillator 99.

The switching signals thus applied to emitter electrodes 108 and 109 are shown respectively in FIGURES *5a* and *5b*. Considering first emitter 108, it is seen that the current flowing through this electrode and its associated load resistance corresponds to the intermodulation product of the modulation components at base 110 and the applied switching signal of FIGURE *5a*. Accordingly, it will be apparent to those skilled in the art that there is developed across emitter load resistor 113 a signal component corresponding to the R–Y color difference signal. A similar procedure occurs in connection with emitter electrode 109 except that the B–Y color difference signal is developed across emitter load resistor 114 since the switching signal applied to this emitter electrode is in phase coherence with that color control signal. Thus, the R–Y and B–Y color control signals are developed by synchronous detection at emitter electrodes 108 and 109 respectively and are directly coupled to respective amplifiers 104 and 105 for application to the image reproducer 89 in conventional fashion.

As will be recalled, the remaining or G–Y color control signal is developed by vector addition of the R–Y and B–Y vectors; in this connection it will be recalled that the G–Y signal is defined as follows:

$$G\text{–}Y = -.51(R\text{–}Y) - .19(B\text{–}Y)$$

In order to function as a conventional transistor and to effect detection of the two color difference signals at its emitter electrodes, the collector of transistor 107 must be coupled through an appropriate load resistor to an operating supply. This inherent connection is utilized in the present invention to directly provide the G–Y color control signal. Specifically, it will be recognized that the individual currents flowing in emitter resistors 113 and 114 both flow in the common collector load resistor 116. Furthermore, the voltage developed across collector resistor 116, as a result of conventional transistor action, consists of a phase inverted and amplified vector summation of the individual voltages developed across resistors 113 and 114 combined in a weighted relationship dependent upon the relative magnitudes of resistors 113 and 114. Thus, to develop the G–Y signal across resistor 116, it is seen from the above equation that resistor 114 should be approximately 2.7 times greater in resistance than resistor 113. This signal is coupled to image reproducer 89 by amplifier 103.

From the graphs of FIGURE 5, it will be observed that unlike the situation described in connection with the stereo detector of FIGURE 1, there is a common time interval during which both emitters 108 and 109 are gated to an on condition. One such interval T1–T2 is illustrated in the drawing and as seen corresponds to one-half the duration of the switching signal. This condition may cause some degree of undesired interaction between the two emitter load circuits.

Figure 6:
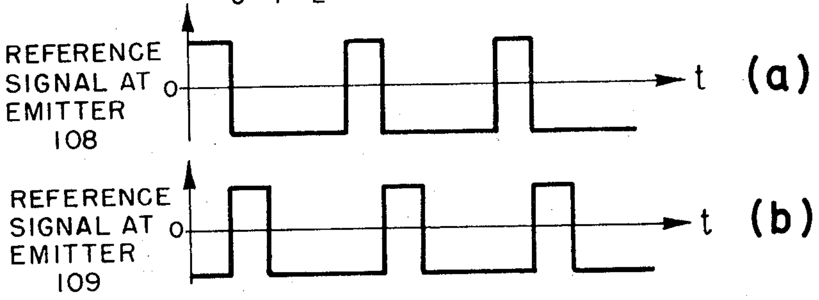

The above condition may be obviated by adjusting the pulse widths of the respective reference signals to correspond to those of FIGURES 6*a* and 6*b*. As is clear from this drawing, each of the switching signals is shortened to a duration corresponding in time to one-half of that of their counterparts of FIGURE 5. Under these circumstances, emitter electrodes 108 and 109 are rendered conductive and nonconductive in alternation. Of course, the detection efficiency under the arrangement of FIGURE 6 is likewise reduced to one-half of that provided by using switching signals of the duration shown in FIGURE 5.

Figure 7:
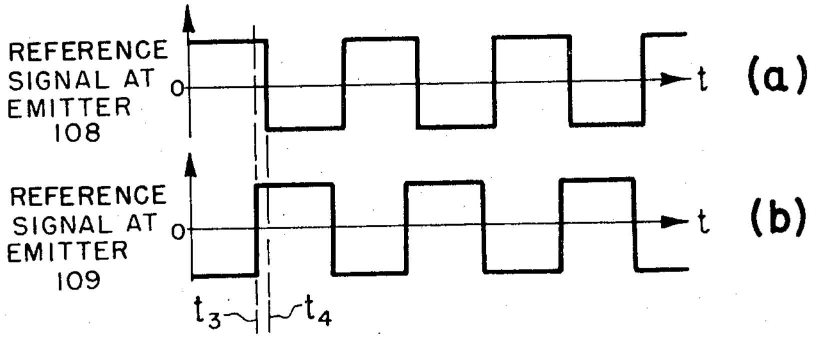

A further alternative procedure for minimizing the interaction between emitters 108 and 109 but yet which does not substantially reduce detection efficiency will be explained in conjunction with FIGURE 7. The reference signal illustrated in FIGURE 7*a* is of a phase for demodulating the R–Y color signal while the reference signal of FIGURE 7*b* is of a phase which is coherent with the G–Y color signal. Under these circumstances, it is seen that phase shifter 101 is still not required but that phase shifter 102 must now introduce an effective phase advance of 146.8 degrees. Accordingly, the R–Y color signal is still developed at emitter electrode 108 but it is now the G–Y control signal that is developed at emitter electrode 109. However, from the phasor diagram of FIGURE 4, it is seen that a properly weighted vector addition of the R–Y and G–Y signals in inverted phases yields the B–Y color difference signal across the collector load resistor 116 of transistor 107. In this instance, emitter load resistors 113 and 114 must be related in magnitude by the ratio of about 0.5 to effect the proper vector summation.

Thus, by demodulating along the R–Y and G–Y axes full width reference pulses may be employed with only a relative short duration overlapping, such as depicted as occurring between interval T3–T4. Of course, if desired the individual pulses may be shortened somewhat in the manner discussed in conjunction with FIGURE 6 to preclude any time domain overlapping.

Figure 8:
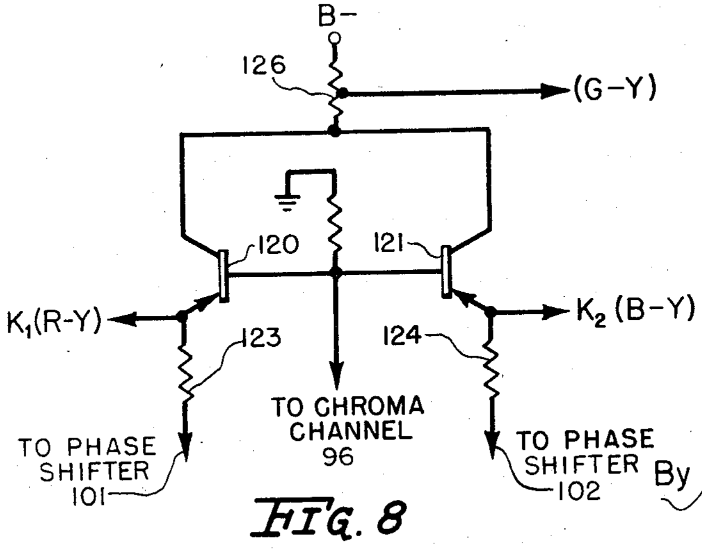
FIGURE 8 is an alternative embodiment of the invention useful in a color television receiver.

An alternate embodiment of the invention, likewise useable in the color television receiver of FIGURE 3, is illustrated in the partial schematic diagram of FIGURE 8. Specifically, this circuit comprises a pair of PNP transistors 120 and 121 having their base electrodes coupled through a common input circuit to chroma channel 96. The emitter electrodes of transistors 120, 121 are coupled through individual load resistors 123, 124 to phase shifting circuits 101 and 102, respectively. The requisite operating bias for these transistors is provided in conventional fashion from a B— supply through a common collector load impedance, here consisting of a single, tapped load resistance 126.

The operation of this circuit is quite similar to that discussed in conjunction with FIGURE 3. Assuming that phase shifting networks 101 and 102 supply reference signals respectively in phase with the R–Y and B–Y color difference signals, it will now be understood that concurrent application of the chroma information to the bases of these transistors results in the R–Y signal being developed across emitter load resistor 123 and the B–Y control signal being developed across emitter load resistor 124. By conventional transistor action, the signals developed across emitter load resistors 123, 124 will be transferred to their collectors in opposite phases and in the present arrangement will be vectorially combined in an opposite phase in their common load resistance 126. As will be recalled, in order to develop the G–Y signal across load resistor 126, it is necessary that the R–Y signal be present in an amplitude approximately 2.7 times greater than that of the B–Y signal. Accordingly, load resistor 124 must be approximately 2.7 times greater than load resistance 123 to effect the necessary degeneration in amplitude of the B–Y signal.

As with other embodiments of the present invention, the circuit of FIGURE 8 develops the third color control signal by the use of only that apparatus required for synchronous detection of two color difference signals; furthermore no special purpose tubes or special phase inverting circuits are required. It will be also noted that the circuit of FIGURE 8, by using two independent transistors, poses no possible problems as to cross-talk between the respective emitter circuits. For this reason, switching signals providing an overlapping on condition for the emitter junctions of transistors 120 and 121, such as those shown in FIGURES 5*a* and 5*b*, are always acceptable. In connection with FIGURE 8, it is highly desirable that transistors 120 and 121 be essentially identical; this objective is readily attained by making these transistors in integrated form wherein their identity is assured by manufacture at the same time and under identical processing conditions.

Heretofore in the specification, it has been assumed that two of the three primary color control signals are always directly demodulated and the third control signal derived by matrixing of these demodulated signals. This need not be the case. For example, to take full advantage of the bandwidth of the color transmission, demodulation should theoretically occur along the I and Q axes shown in FIGURE 4 and the three primary control signals derived by matrixing of these quadrature related secondary control signals. The illustrated circuits of the present invention have full utility in this context. Specifically, application of properly phased color reference signals to the individual emitter electrodes of the amplifying means shown in FIGURES 3 and 8 results in the I and Q signals being developed at respective ones of these electrodes. The R-Y and B-Y color control signals may be developed from the I and Q signals at the emitter electrodes of the amplifying means by direct matrixing, i.e., without any polarity inversion, of the I and Q signals. The G-Y color control signal is directly developed in the common collector load circuit by properly weighting the summation of the I and Q signals through adjustment of the individual emitter load resistors in the manner previously discussed.

I claim:

1. A combined synchronous demodulator and active matrix network for developing a plurality of demodulated output signals from a received signal including a suppressed-carrier, amplitude-modulated component, comprising:

- means for locally deriving a reference signal having a frequency equal to that of the absent carrier;
- transistor amplifying means having two emitter electrodes and at least one each of a base and a collector electrode;
- means for applying said reference signal in an effectively different phase to each of said two emitter electrodes;

means for applying at least said suppressed-carrier, amplitude-modulated signal to each base electrode of said amplifying means;

means including individual load resistors coupled to said two emitter electrodes for developing first and second distinct, demodulated output signals in response to application of said reference and modulated signals as aforesaid;

and passive circuit means including a collector load resistor, coupled to each collector electrode of said amplifying means for deriving a third distinct output signal consisting of a phase inverted and amplified vector summation of said first and second distinct, demodulated output signals combined in a predetermined weighted relationship.

2. The combination according to claim 1 in which said transistor amplifying means consists of a single dual emitter transistor.

3. The combination according to claim 1 in which said transistor amplifying means consists essentially of a pair of transistors each including only an emitter, collector and base electrode.

4. The combination according to claim 3 in which said reference signal means provides only a single phase output and said two transistors are of an opposite gender thereby permitting said reference signal to be applied in an effectively different phase to each of said two emitter electrodes.

5. The combination according to claim 1 in which the modulation of said suppressed-carrier signal comprises the difference of two stereophonically related audio signals and in which said received signal also includes an audio component comprising the sum of said two audio signals.

6. The combination according to claim 5 in which said first and second output signals each consist of a respective one of said audio signals plus a small, unwanted contribution from the other of said audio signals and in which said third output signal is passively matrixed with said first and second output signals to derive said two stereophonically related signals separated one from the other.

7. The combination according to claim 6 in which said emitter load resistors are of equal value and related to the value of said collector load resistor in proportion to the ratio between the desired signal component and the unwanted contribution developed across each emitter resistor.

8. The combination according to claim 7 and further including means for reverse biasing both of said emitter electrodes with respect to said base electrode and coupling a received signal in shunt to said demodulator and active matrix network.

9. The combination according to claim 7 and further including means for effectively disabling said demodulation signal developing means and for coupling said carrier modulation components in shunt to said stereo demodulator.

10. The combination according to claim 1 in which said suppressed-carrier component is modulated with a plurality of color control signals collectively defining the hue and saturation of an image to be reproduced.

11. The combination according to claim 10 in which said amplifying means consists essentially of a single dual emitter transistor.

12. The combination according to claim 11 in which said common collector load circuit consists essentially of a load resistor coupled between said collector electrode and means for providing an operating bias for said dual emitter transistor.

13. The combination according to claim 12 in which said emitter electrodes are reverse-biased with respect to said base electrode in the absence of a reference signal exceeding a predetermined threshold.

14. The combination according to claim 13 in which said reference signal has a duty cycle of approximately 50 percent for substantially precluding cross-talk in said two emitter load impedances.

15. The combination according to claim 10 in which said amplifying means consists essentially of a pair of transistors each having only one each of an emitter, collector and base electrode.

16. The combination according to claim 15 in which said common collector load circuit consists essentially of a single resistor coupled from both of said collector electrodes to means for providing an operating bias for said transistors.

References Cited

UNITED STATES PATENTS

| | | | |
|---|---|---|---|
| 3,129,288 | 4/1964 | De Vries | 325—487 X |
| 3,151,218 | 9/1964 | Dias. | |
| 3,158,816 | 11/1964 | Harris | 329—50 |
| 3,264,413 | 8/1966 | Merritt. | |
| 3,306,981 | 2/1967 | Hecht. | |
| 3,383,608 | 5/1968 | Felix | 325—487 X |
| 3,405,229 | 10/1968 | Parker. | |

RALPH D. BLAKESLEE, Primary Examiner

U.S. Cl. X.R.

329—50; 178—5.4